US012490034B2

(12) United States Patent
Björn et al.

(10) Patent No.: US 12,490,034 B2
(45) Date of Patent: Dec. 2, 2025

(54) BONE CONDUCTION IMPLANT

(71) Applicant: Cochlear Limited, Macquarie University (AU)

(72) Inventors: Göran Björn, Onsala (SE); Stefan Magnander, Gothenburg (SE); Marcus Andersson, Gothenburg (SE)

(73) Assignee: Cochlear Limited, Macquarie University (AU)

(*) Notice: Subject to any disclaimer, the term of this patent is extended or adjusted under 35 U.S.C. 154(b) by 0 days.

(21) Appl. No.: 18/535,392

(22) Filed: Dec. 11, 2023

(65) Prior Publication Data

US 2024/0107243 A1 Mar. 28, 2024

Related U.S. Application Data

(62) Division of application No. 13/270,691, filed on Oct. 11, 2011, now Pat. No. 11,843,918.

(51) Int. Cl.
*H04R 25/00* (2006.01)

(52) U.S. Cl.
CPC .................................. *H04R 25/606* (2013.01)

(58) Field of Classification Search
CPC .......................... H04R 25/606; H04R 2460/13
See application file for complete search history.

(56) References Cited

U.S. PATENT DOCUMENTS

| | | | | |
|---|---|---|---|---|
| 4,645,453 | A | 2/1987 | Niznick | |
| 5,049,072 | A | 9/1991 | Lueschen | |
| 5,879,161 | A | 3/1999 | Lazzara | |
| 5,989,028 | A | 11/1999 | Niznick | |
| 2004/0032962 | A1 | 2/2004 | Westerkull | |
| 2005/0019729 | A1 | 1/2005 | Fisher et al. | |
| 2005/0249366 | A1 | 11/2005 | Westerkull | |
| 2006/0050913 | A1 | 3/2006 | Westerkull | |
| 2006/0211910 | A1* | 9/2006 | Westerkull ........... | H04R 25/405 600/25 |
| 2007/0009853 | A1* | 1/2007 | Pitulia .................. | H04R 25/606 433/141 |
| 2007/0270684 | A1 | 11/2007 | Cawley et al. | |
| 2007/0298379 | A1 | 12/2007 | D'Alise | |

(Continued)

FOREIGN PATENT DOCUMENTS

| | | | |
|---|---|---|---|
| EP | 0715839 | A2 | 12/1996 |
| WO | 03001845 | A1 | 1/2003 |
| WO | 2011017733 | A1 | 2/2011 |

OTHER PUBLICATIONS

European Extended Search Report for European Patent Application No. 12839467.3, dated Apr. 28, 2015.

(Continued)

*Primary Examiner* — Thaddeus B Cox

(74) *Attorney, Agent, or Firm* — Pilloff Passino & Cosenza LLP; Martin J. Cosenza

(57) ABSTRACT

A bone conduction implant, including a bone fixture including a male screw section configured to screw into a skull and an abutment configured to be rigidly attached to the bone fixture, wherein the abutment includes an exterior surface diameter lying on a first plane normal to a longitudinal axis of the bone conduction implant that is less than or substantially equal to the maximum thread diameter of the male screw section of the bone fixture.

20 Claims, 8 Drawing Sheets

(56) References Cited

U.S. PATENT DOCUMENTS

| | | | |
|---|---|---|---|
| 2008/0292125 A1 | 11/2008 | Asnes | |
| 2009/0082817 A1 | 3/2009 | Jinton et al. | |
| 2009/0248085 A1 | 10/2009 | Parker | |
| 2009/0263763 A1 | 10/2009 | Shepard | |
| 2009/0298015 A1 | 12/2009 | Al-Attar | |
| 2010/0137675 A1* | 6/2010 | Parker .................. | H04R 25/606<br>600/25 |
| 2010/0196850 A1 | 8/2010 | König | |
| 2010/0292529 A1 | 11/2010 | Westerkull et al. | |
| 2012/0082956 A1 | 4/2012 | Sakamoto | |
| 2013/0090518 A1 | 4/2013 | Bjorn et al. | |

OTHER PUBLICATIONS

International Search Report and Written Opinion for International Application No. PCT/IB2012/055519 mailed Feb. 1, 2013.

* cited by examiner

BONE CONDUCTION IMPLANT

The present application is a Divisional application of U.S. patent application Ser. No. 13/270,691, filed Oct. 11, 2011, now U.S. Pat. No. 11,843,918, naming Göran BJÖRN as an inventor, the entire contents of that application being incorporated herein by reference in its entirety.

BACKGROUND

Field of the Invention

The present invention relates generally to hearing prosthesis and, more particularly, to a bone conduction implant.

Related Art

For persons who cannot benefit from traditional acoustic hearing aids, there are other types of commercially available hearing prostheses such as, for example, bone conduction hearing prostheses (commonly referred to as "bone conduction devices"). Bone conduction devices mechanically transmit sound information to a recipient's cochlea by transferring vibrations to person's skull. This enables the hearing prosthesis to be effective regardless of whether there is disease or damage in the middle ear.

Traditionally, bone conduction devices transfer vibrations from an external vibrator to the skull through a bone conduction implant that penetrates the skin and is physically attached to both the vibrator and the skull. Typically, the external vibrator is connected to the percutaneous bone conduction implant located behind the outer ear facilitating the efficient transfer of sound via the skull to the cochlea. The bone conduction implant connecting the vibrator to the skull generally comprises two components: a bone attachment piece (e.g., bone fixture/fixture) that is attached or implanted directly to the skull, and a skin penetrating piece attached to the bone attachment piece, commonly referred to as an abutment.

SUMMARY

In one aspect of the present invention, there is a bone conduction implant, comprising a bone fixture including a male screw section configured to screw into a skull and an abutment configured to be rigidly attached to the bone fixture, wherein the abutment includes an exterior surface diameter lying on a first plane normal to a longitudinal axis of the bone conduction implant that is less than or substantially equal to the maximum thread diameter of the male screw section of the bone fixture.

In another aspect of the present invention, there is an apparatus for a bone conduction implant, comprising an abutment including a fixture connection section and an end opposite the fixture connection section, the abutment being configured to be rigidly attached to a bone fixture, wherein an exterior of the abutment includes a first portion closer to the fixture connection section than the end, the first portion narrowing with position along a longitudinal axis of the abutment in a direction away from the fixture connection section towards the end.

In another aspect of the present invention, there is a bone conduction implant, comprising, a bone fixture configured to be implanted in a recipient's skull, the bone fixture having at least one interior bore, an abutment, the abutment including an interior through bore, and an abutment screw extending through the through bore of the abutment, the abutment screw being configured to screw into the at least one interior bore to rigidly attach the abutment to the bone fixture, wherein the abutment screw includes an end portion configured to extend out of the abutment away from the bone fixture when the abutment is rigidly attached to the bone fixture, and wherein the end portion forms a coupling component configured to couple to a coupling adapter of an operationally removable component of a bone conduction device.

In another aspect of the present invention, there is a bone conduction implant, comprising a bone fixture configured to be implanted in a recipient's skull, the bone fixture having an interior bore including female screw threads and an abutment including a boss having male screw threads, the abutment being configured to be rigidly attached to the bone fixture by screwing the male screw threads of the boss into the interior bore of the bone fixture.

In another aspect of the present invention, there is an apparatus for a bone conduction implant, comprising an abutment including a fixture connection section and an end opposite the fixture connection section, the abutment being configured to be rigidly attached to a bone fixture at the fixture connection section, wherein the abutment is configured to removably connect to a magnetic implant abutment coupling.

BRIEF DESCRIPTION OF THE DRAWINGS

Embodiments of the present invention are described herein with reference to the attached drawing sheets in which.

DETAILED DESCRIPTION

In an exemplary embodiment, there is a bone conduction implant comprising a bone fixture and an abutment configured to be rigidly attached thereto. The bone fixture is configured to be implanted in a recipient's skull and includes a male screw section configured to screw into a skull. The male screw section has a maximum thread diameter. The abutment has an exterior surface and an exterior surface diameter lying on a first plane normal to a longitudinal axis of the bone conduction implant. The exterior surface diameter is less than or substantially equal to the maximum thread diameter.

In an alternate embodiment, there is a bone conduction implant that includes an abutment that has a section that narrows and then broadens with position along the longitudinal axis of the abutment, and, in some embodiments, has an hourglass shape.

In yet another alternate embodiment, there is a bone conduction implant that comprises an abutment and a bone fixture that are rigidly removably attached to one another without the use of an abutment screw. Still further, some embodiments include a magnetic coupling that is removably attachable to the abutment and/or bone screw so as to permit magnetic attachment between the bone conduction implant and a removable component containing a vibrating actuator.

In yet another exemplary embodiment, there is a bone conduction implant that includes an abutment screw that forms a coupling configured to couple to a removable component containing a vibrating actuator.

Figure 1:
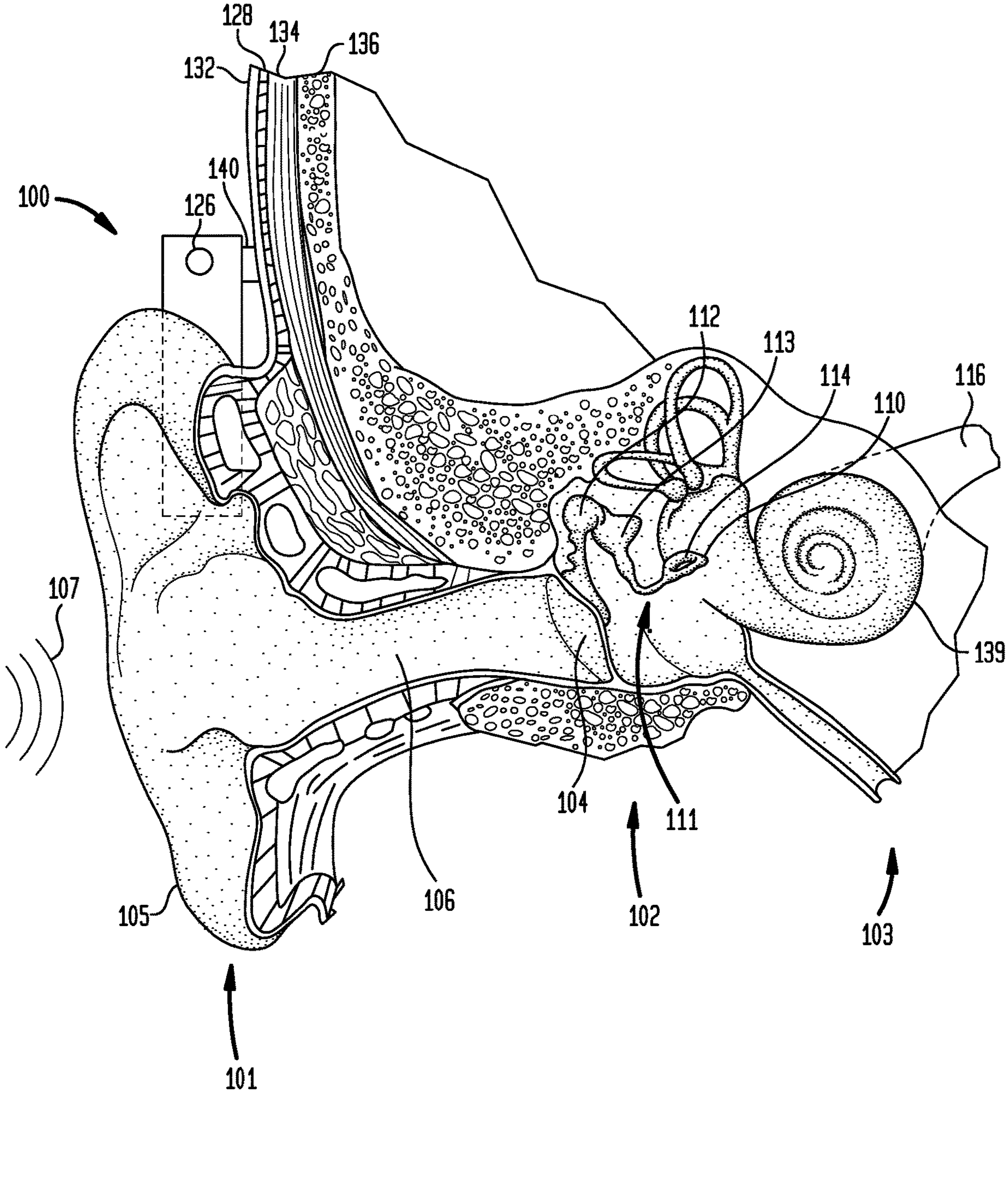
FIG. 1 is a perspective view of a percutaneous bone conduction device in which embodiments of the present invention may be implemented.

FIG. 1 is a perspective view of a bone conduction device 100 in which embodiments of the present invention may be implemented. As shown, the recipient has an outer ear 101, a middle ear 102 and an inner ear 103. Elements of outer ear 101, middle ear 102 and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 210 through three bones of middle ear 102, collectively referred to as the ossicles 111 and comprising the malleus 112, the incus 113 and the stapes 114. The ossicles 111 of middle ear 102 serve to filter and amplify acoustic wave 107, causing oval window 210 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1 also illustrates the positioning of bone conduction device 100 relative to outer ear 101, middle ear 102 and inner ear 103 of a recipient of device 100. As shown, bone conduction device 100 is positioned behind outer ear 101 of the recipient and comprises a sound input element 126 to receive sound signals. Sound input element may comprise, for example, a microphone, telecoil, etc. In an exemplary embodiment, sound input element 126 may be located, for example, on or in bone conduction device 100, or on a cable extending from bone conduction device 100.

In an exemplary embodiment, bone conduction device 100 comprises an operationally removable component and a bone conduction implant. The operationally removable component operationally removably attaches to the bone conduction implant. By operationally removably attaches, it is meant that it is removable in such a manner that the recipient can relatively easily attach and remove the operationally removable component during normal use of the bone conduction device 100. This as contrasted with how the bone conduction implant is attached to the skull, as will be detailed below. The operationally removable component includes a sound processor (not shown), a vibrating electromagnetic actuator (not shown) and/or various other operational components, such as sound input device 126. More particularly, sound input device 126 (e.g., a microphone) converts received sound signals into electrical signals. These electrical signals are processed by the sound processor. The sound processor generates control signals which cause the actuator to vibrate. In other words, the actuator converts the electrical signals into mechanical motion to impart vibrations to the recipient's skull.

As illustrated, the operationally removable component of the bone conduction device 100 further includes a coupling apparatus 140 configured to operationally removably attach the operationally removable component to a bone conduction implant (also referred to as an anchor system and/or a fixation system) which is implanted in the recipient. In the embodiment of FIG. 1, coupling apparatus 140 is coupled to the bone conduction implant (not shown) implanted in the recipient in a manner that is further detailed below with respect to exemplary embodiments of the bone conduction implant. Briefly, an exemplary bone conduction implant may include a percutaneous abutment attached to a bone fixture via a screw, the bone fixture being fixed to the recipient's skull bone 136. The abutment extends from the bone fixture which is screwed into bone 136, through muscle 134, fat 128 and skin 232 so that coupling apparatus 140 may be attached thereto. Such a percutaneous abutment provides an attachment location for coupling apparatus 140 that facilitates efficient transmission of mechanical force.

Figure 2:
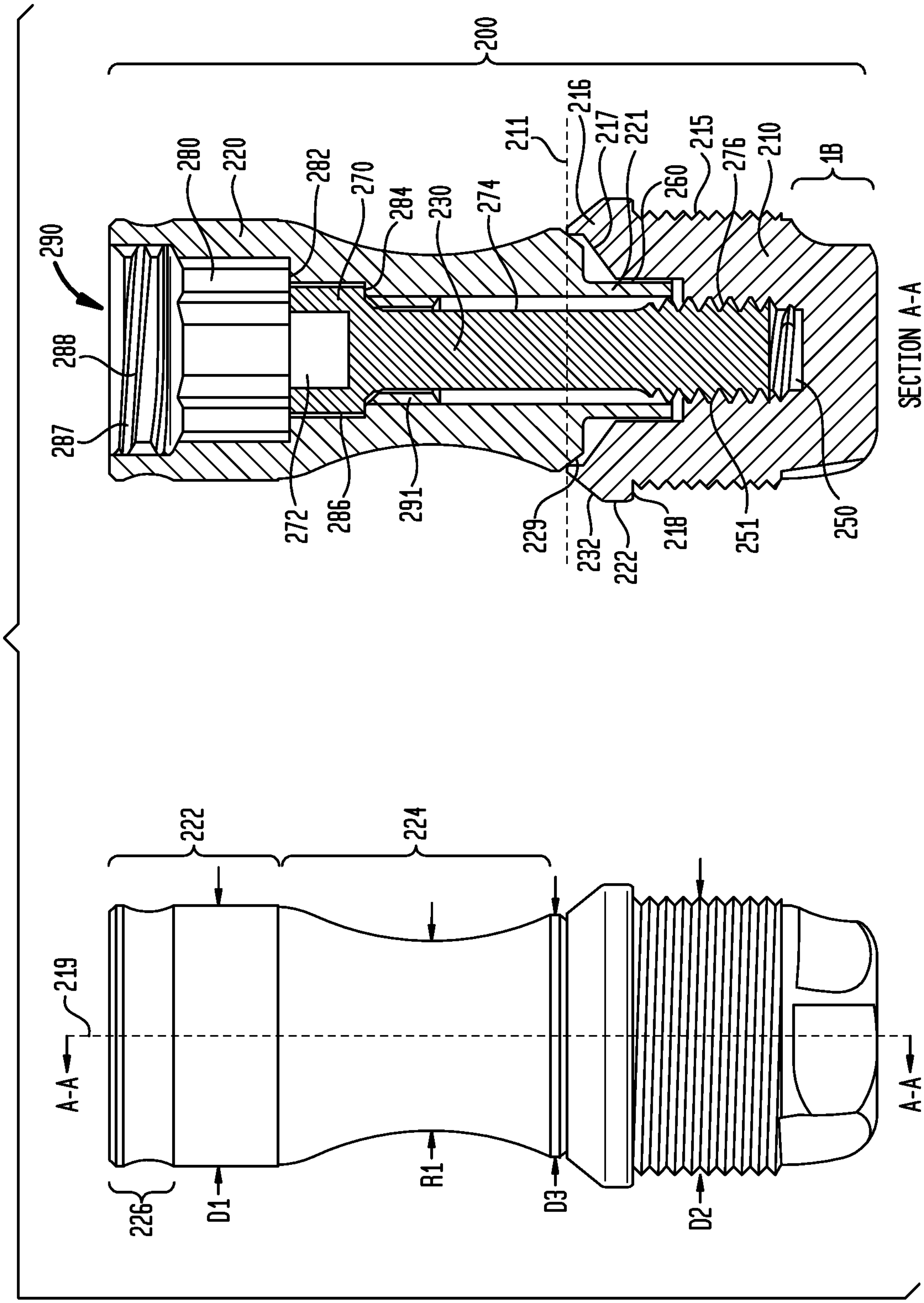
FIG. 2 depicts a side view and a cross-sectional view of a bone conduction implant according to an exemplary embodiment.

FIG. 2 depicts an exemplary bone conduction implant 200 according to an embodiment configured to be coupled to coupling apparatus 140 of the operationally removable component of the bone conduction device 100. In FIG. 2, the outer profile of the bone conduction implant 200 may be seen along with a cross-section A-A of the bone conduction implant 200 taken as shown. Bone conduction implant 200 includes a bone fixture 210 configured to screw into the skull bone 136, a skin-penetrating abutment 220 and an abutment screw 230 that is in the form of an elongate coupling shaft. As may be seen, the abutment screw 230 connects and holds the abutment 220 to the fixture 210, thereby rigidly attaching abutment 220 to bone fixture 210.

It is noted that by way of example only and not by way of limitation, FIG. 2 and FIGS. 3-6 are drawn to scale, although other embodiments may be practiced having different scales.

Some exemplary features of the bone fixture 210 will now be described, followed by exemplary features of the abutment 220 and the abutment screw 230.

Bone fixture 210 (hereinafter sometimes referred to as fixture 210) may be made of any material that has a known ability to integrate into surrounding bone tissue (i.e., it is made of a material that exhibits acceptable osseointegration characteristics). In one embodiment, fixture 210 is formed from a single piece of material and has a main body. In an embodiment, the fixture 210 is made of titanium. The main body of bone fixture 210 includes outer screw threads 215 forming a male screw which is configured to be installed into the skull 136. Fixture 210 also comprises a flange 216 configured to function as a stop when fixture 210 is installed into the skull. Flange 216 prevents the bone fixture 210 in general, and, in particular, screw threads 215, from potentially completely penetrating through the skull. Fixture 210 may further comprise a tool-engaging socket having an internal grip section for easy lifting and handling of fixture 210, as will be described in further detail below. An exemplary tool-engaging socket is described and illustrated in U.S. Provisional Application No. 60/951,163, entitled "Bone Anchor Fixture for a Medical Prosthesis," filed Jul. 20, 2007, which, in some embodiments, may be used exactly as detailed therein and/or in a modified form, to install and manipulate the bone fixture 210.

The body of fixture 210 may have a length sufficient to securely anchor the fixture 210 to the skull without penetrating entirely through the skull. The length of the body may therefore depend on the thickness of the skull at the implantation site. In one embodiment, the fixture 210 has a length that is no greater than 5 mm, measured from the planar bottom surface 218 of the flange 216 to the end of the distal region 1B (this limits and/or prevents the possibility that the fixture 210 might go completely through the skull). In another embodiment, this length may be anywhere from about 3.0 mm to about 5.0 mm.

The distal region 1B of fixture 210 may also be fitted with self-tapping cutting edges (e.g., three edges) formed into the exterior surface of the fixture 210. Further details of the self-tapping features are described in International Patent Application Publication WO 02/09622, and may be used with some embodiments of bone fixtures exactly as detailed therein and/or in a modified form, to configure the fixtures detailed herein to be installed into a skull.

As illustrated in FIG. 2, flange 216 has a planar bottom surface 218 for resting against the outer bone surface, when anchoring fixture 210 has been screwed down into the skull. Flange 216 may have a diameter which exceeds the peak diameter (maximum diameter) of the screw threads 215 (the screw threads 215 of the fixture 210 may have a maximum diameter of about 3.5 to about 5.0 mm). In one embodiment, the diameter of the flange 216 exceeds the peak diameter of the screw threads 215 by approximately 10-20%. Although flange 216 is illustrated in FIG. 2 as being circular, flange 216 may be configured in a variety of shapes so long as flange 216 has a diameter or width that is greater than the peak diameter of the screw threads 215. Also, the size of flange 216 may vary depending on the particular application for which the bone conduction implant 200 is intended.

As may be seen in FIG. 2, the outer peripheral surface of flange 216 has a cylindrical part 222 and a flared top portion 232. The upper end of flange 216 is designed with an open cavity having a tapered inner side wall 217. The tapered inner side wall 217 is adjacent to the grip section (not shown). The interior of the fixture 210 further includes an inner lower bore 250 having female screw threads 251 for securing a coupling shaft of abutment screw 230 (described further below). As may be seen, the fixture 210 further includes an inner upper bore 260 that receives a bottom portion of abutment 220.

In one embodiment, increased stability to the attachment between fixture 210 and abutment 220 is provided as detailed in U.S. Patent Application Publication No. 2009/0082817, conceptually and/or exactly, to provide increased stability to the attachment of the fixture 210 and the abutment 220 implemented in at least some embodiments described herein.

In an exemplary embodiment, the flange 216 may be in the form of a protruding hex instead of being circular. That is, flange 216 may have a hexagonal cross-section that lies on a plane normal to the longitudinal axis 219 of the bone fixture 220/bone conduction implant 200 such that a female hex-head socket wrench may be used to apply torque to the bone fixture 210. However, in the embodiment illustrated in FIG. 2, the flange 216 has a smooth, upper end that has a circular cross-section that lies on the aforementioned plane, and thus does not have a protruding hex. The smooth upper end of the flange 216 and the absence of any sharp corners provides for improved soft tissue adaptation. As mentioned above, flange 216 also comprises a cylindrical part 222 which, together with the flared upper part 232, provides sufficient height in the longitudinal direction for connection with the abutment 220.

Figure 3:
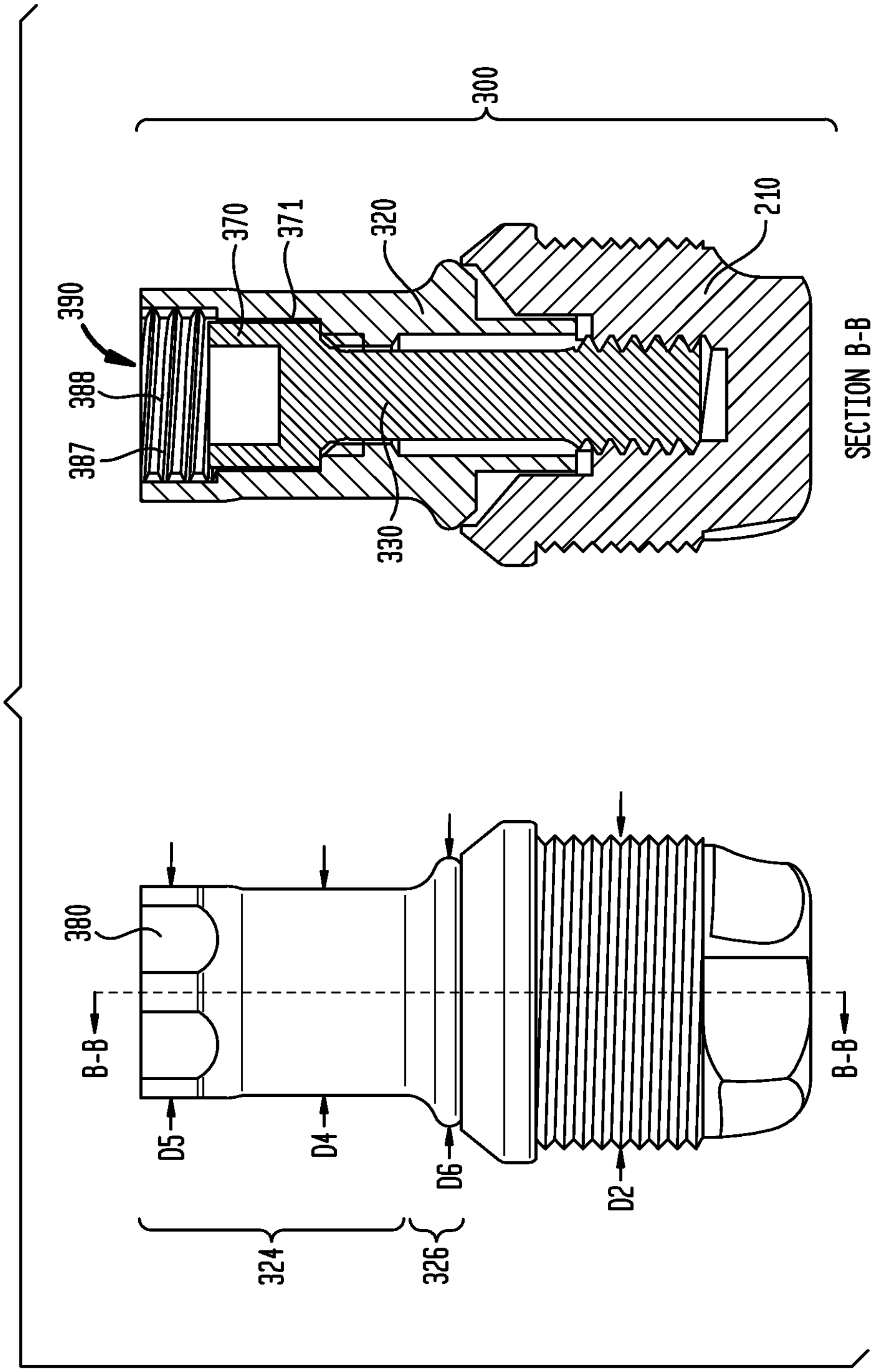
FIG. 3 depicts a side view and a cross-sectional view of a bone conduction implant according to an alternate exemplary embodiment.
Figure 4:
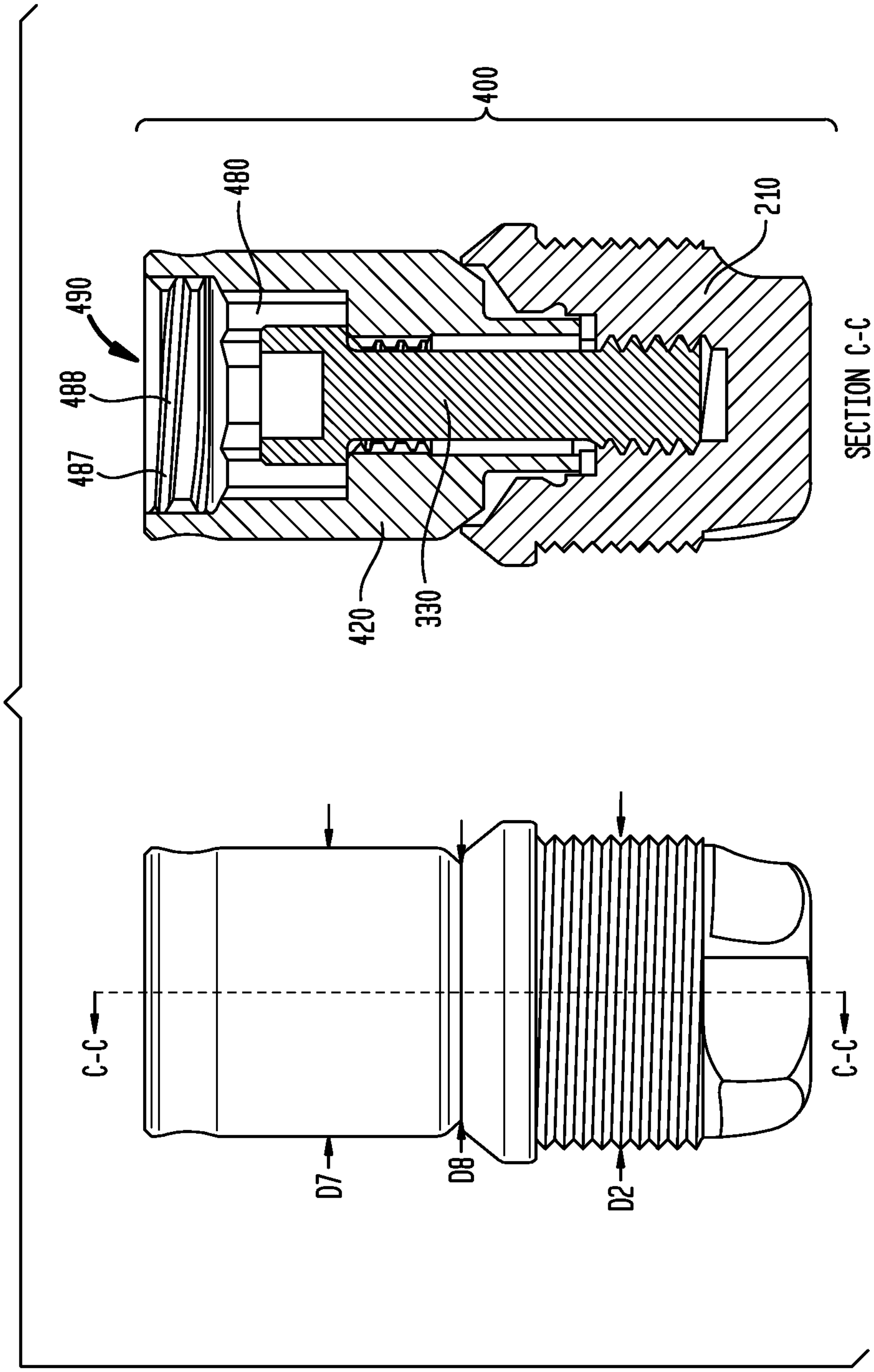
FIG. 4 depicts a side view and a cross-sectional view of a bone conduction implant according to yet another alternate exemplary embodiment.

The embodiments of bone conduction implants 300 and 400 of FIGS. 3-4, described further below, are presented as utilizing the bone fixture 210 just detailed. Briefly moving ahead to the bone conduction implants 500 and 600 of FIGS. 5 and 6, these embodiments utilize fixtures 510 and 610, respectively, having different configurations. Many of the features of the bone fixtures of FIGS. 2-4 are similar and/or the same as those of FIGS. 5 and/or 6, as will be apparent from the figures, while other features are different. As may be seen in FIG. 5, bone fixture 510 includes a tapered inner side wall 517 that begins below the bottom surface of flange 516, as compared to a tapered inner side wall 217 of fixture 210 that begins above the bottom surface 218 of flange 216. Further, as will be seen, fixture 510 includes grooves 522 located in the flange 516. As will be described further below, these grooves 522 receive teeth of an installation tool to facilitate insertion of fixture 510 into the skull.

With respect to FIG. 6, bone fixture 610 substantially corresponds to bone fixture 210 of FIG. 2, except that it includes an offset receptacle 622 configured to receive a non-symmetrical boss 625 of abutment 620, as will be described further below.

Any bone fixture of any type, size/having any geometry may be used in some embodiments providing that the bone fixture permits embodiments as detailed herein and variations thereof to be practiced.

As noted above, bone conduction implant 200 further includes an abutment screw 230 as depicted in FIG. 2. Abutment screw 230 includes a screw head 270 that has an internal upper bore 272 that may form a unigrip, internal hex or multi-lobular configuration for a cooperating insertion tool (not illustrated here). The screw head 270 is connected to elongate member 274 that extends downward as shown. At the bottom of the abutment screw 230 are male screw threads 276 formed in the elongate member 274. These male screw threads are dimensioned to interact with the corresponding female threads of inner lower bore 250 of bone fixture 210. Upon application of a tightening torque to abutment screw 230, screw head 270 reacts against surface 284 of bore 286 of abutment 230 to pull abutment 230 to fixture 210, as will be described further below.

FIGS. 3 and 4 depict an alternate embodiment of an abutment screw 330, which includes a relief 371 in screw head 370, as may be seen.

Figure 6:
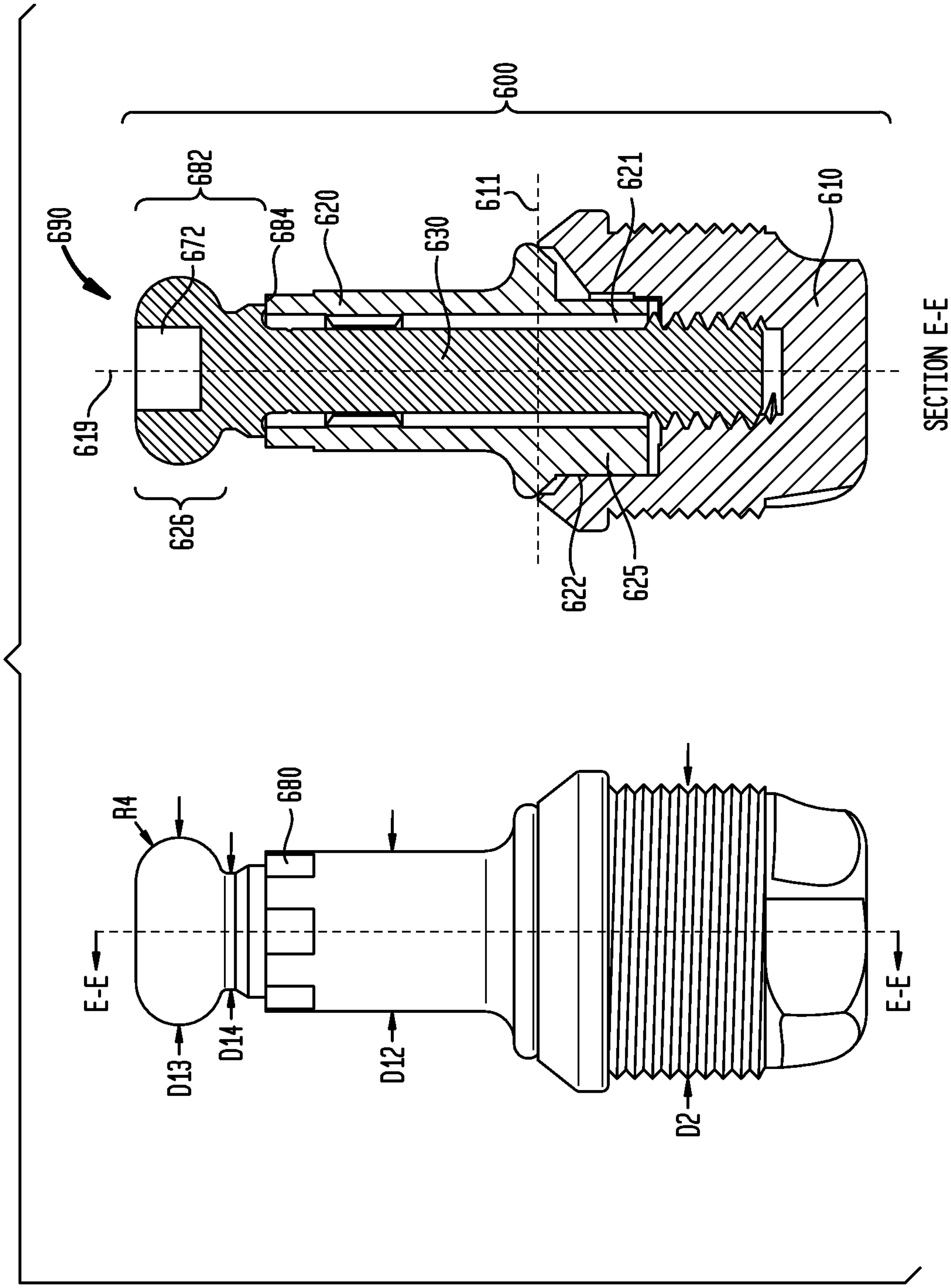
FIG. 6 depicts a side view and a cross-sectional view of a bone conduction implant according to yet another alternate exemplary embodiment.

FIG. 6 depicts yet another alternate embodiment of an abutment screw 630 where the operationally removable component of the bone conduction device 100 attaches directly to the abutment screw 630. The principle of operation of abutment screw 630 generally corresponds to that of abutment screws 230 and 330. One exception is that abutment screw 630 reacts against an outer surface 684 of abutment 620, as opposed to an interior surface of the abutment, to pull abutment 620 to fixture 610, as may be seen. Additional particulars of this embodiment will be described further below.

Any abutment screw of any type, size/having any geometry may be used in some embodiments providing that the abutment screw permits embodiments as detailed herein and variations thereof to be practiced.

As noted above, bone conduction implant 200 further includes an abutment 220 as depicted in FIG. 2. In the embodiment of FIG. 2, abutment 220 is symmetrical. In this regard, the exterior surfaces of abutment 220 depicted in FIG. 2 form concentric outer profiles about longitudinal axis 219. This is also the case for the portions of the abutments of FIGS. 3-6 with respect to the portions thereof extending above the bone fixture (i.e., above reference planes 211, 511 and 611 discussed further below). As may be seen, the exterior surfaces of abutment 220 establish diameters lying on planes normal to longitudinal axis 219 that vary along the length of longitudinal axis 219. More specifically, abutment 220 includes diameter D1 corresponding to the maximum diameter of the abutment on these planes. In an exemplary embodiment, D1 is less than or substantially equal to (including equal to) the maximum thread diameter D2 of external threads 215 of the bone fixture 210 to which abutment 220 is designed to be connected.

In an exemplary embodiment D1 may be in a range from about (which, as used herein, includes exactly) 3.8 mm to about 4.45 mm. Further, in an exemplary embodiment, the ratio of D1 to D2 falls within the range of about 0.8 to 1 on the low end and 1 to 1 on the high end. As will be detailed herein, some embodiments may be practiced such that the ratio of D1 to D2 falls at or below about 1 to 1 (e.g., 0.8 to 1, 0.9 to 1, 1 to 1, etc.).

In an exemplary embodiment, utilizing bone conduction implants having some and/or all of the aforementioned ranges and/or variations thereof and as detailed further below and variations thereof result in a more aesthetically pleasing bone conduction implant in that the size of the portion of the abutment that extends above the skin of the recipient (and is thus visible to an observer of the recipient) is relatively small as compared to traditional bone conduction implants (and is thus less visible and/or noticeable to an observer of the recipient in comparison). In an exemplary embodiment, utilizing bone conduction implants having some and/or all of the aforementioned ranges and/or variations thereof and as detailed further below and variations thereof also result in a sufficiently stable bone conduction implant that may be used with at least some operationally removable components of a bone conduction device so as to enhance hearing as detailed herein.

With respect to the embodiment of FIG. 2, abutment 220 includes a portion having an exterior surface that extends along the longitudinal axis 219 for 100% of a longitudinal length of the abutment that extends from the bone fixture 211 when the abutment is rigidly attached to the bone fixture 210 (i.e., the exterior surface extending above reference plane 211, corresponding to section 224 plus section 222). All exterior surface diameters (i.e., any outer diameter lying on a plane normal to the longitudinal axis 219 above plane 211) of this portion have a maximum length that is less than or substantially equal to the maximum thread diameter D2 of fixture 210. Abutment 220 includes a generally uniform cylindrical section 222 having outer diameters of D1 and slightly less and a generally contoured section 224 having an hourglass shape having outer diameters that are about that of D1 and outer diameters less than D1. In the embodiment of FIG. 2, the hourglass shape is such that it is bounded by diameters D1 and D3 and the diameters therebetween are smaller than diameters D1 and D3. In this regard, section 224 is a portion of the exterior surface of the abutment 220 that extends along the longitudinal axis for about 60% of a longitudinal length of the abutment that extends from the bone fixture (i.e., from plane 211) when the abutment is rigidly attached to the bone fixture 210 (although in other embodiments, it may extend about 30% to about 75%, and any sub-range therein in 1% increments of that length). Section 224 has exterior surface diameters respectively lying on planes normal to the longitudinal axis 219, all of which have a maximum length that is less than or substantially equal to the maximum thread diameter D2 of the fixture 210. Owing to its hourglass shape, the outer diameters of section 224 vary in length such that the relatively long exterior surface diameters are located at ends of section 224 and relatively short exterior surface diameters are located between the relatively long exterior surface diameters, as may be seen. Moreover, the exterior surface diameters of section 224 vary in length such that a minimum external diameter of section 224 is located at a first position along the longitudinal axis and the lengths of the outer diameters increase with position along the longitudinal axis 219 from that first position. With respect to the embodiment of FIG. 2, this variation may be parabolic, although other types of variations may be utilized. In an exemplary embodiment, a cross-section of the abutment 220 has an outer profile such that a substantial portion of section 224 has a radius R1 of about 5 mm to about 7.5, and in an exemplary embodiment R1 is about 6.4 mm (corresponding to a diameter of about 3.2 mm). Of course, in other embodiments, the radii may vary with position along the longitudinal axis 219, consistent with a parabolic curve.

In an exemplary embodiment, the hourglass configuration of abutment 220 permits skin of the recipient to more readily conform to the abutment 220. In an exemplary embodiment, it provides a smooth outer contour facing the surrounding soft tissue of the skin that is not conducive to the formation of pockets or gaps between the skin and the abutment. In an exemplary embodiment, the hourglass configuration provides for reduced formation of and/or elimination of pockets or gaps between the skin and the abutment as compared to, for example, a cylindrical abutment and/or an abutment having an outer profile that expands with position along the longitudinal axis away from the bone fixture 210. This inhibits the entrapment and/or growth of microbes proximate the bone conduction implant. In some embodiments, the hourglass configuration permits integration between the skin and the abutment 220. Integration between the skin and the abutment 220 may be considered to occur when the soft tissue of the skin encapsulates the abutment in fibrous tissue and does not readily dissociate itself from the abutment. This too inhibits the entrapment and/or growth of microbes proximate the bone conduction implant.

In an exemplary embodiment, the abutment 220 is configured and/or implanted at a location in the skull such that the outer surface of the skin is located anywhere between about the minimum diameter of the abutment and about the top of section 224 and/or anywhere between about the minimum diameter of the abutment and the end of the curve R1 at the upper section of 224.

Bores 287 and 280 are located within section 222 and have an opening facing upward (away from the bone fixture 210). Further, within section 222, abutment 220 has female screw threads 288 adjacent bore 280 in bore 287. Female screw threads 288 permit the installation and removal of a magnetic implant abutment coupling (not shown in FIG. 2, but described in general terms with respect to FIG. 7 below) that may be magnetic to form an abutment coupling 290 configured to magnetically couple to the coupling adapter 140 of the operationally removable component of the bone conduction device. This aspect will be described in greater detail below with respect to FIG. 7. Still further, bore 287, in a modified configuration from that depicted in FIG. 2, alone or in combination with bore 280 and/or with outer surface of section 226 may also form an abutment coupling 290 (without the use of the magnetic implant abutment coupling) configured to couple to the coupling adapter 140 of the operationally removable component of the bone conduction device. This aspect will be described in greater detail below with respect to FIG. 8.

The bottom of the abutment 220 includes a fixture connection section 221 extending below reference plane 211 that interfaces with fixture 210. Abutment surface 229 interfaces with the interior edge of flange 232 of fixture 210, as may be seen. Upon sufficient tensioning of abutment screw 230, abutment 220 sufficiently elastically and/or plastically stresses bone fixture 210, and visa-versa, so as to form an effectively hermetic seal at the interface of surface 229 and fixture 210. Such may reduce (including eliminate) the chances of micro-leakage of microbes into the gaps between the abutment 220, fixture 210 and abutment screw 230. Abutment 320 and 420 of FIGS. 3 and 4, respectively, have substantially the same configuration with respect to the fixture connection section 221 of abutment 220.

With reference to FIG. 3, abutment 320 includes a section 324 having an exterior surface that extends along the longitudinal axis for at least about 80% of a longitudinal length of the abutment that extends from the bone fixture 210 when the abutment 320 is rigidly attached to the bone fixture 210. As may be seen, section 324 has a substantially cylindrical portion having a diameter D4 and a top portion having a diameter D5 that is slightly larger than diameter D4. As may be seen, all diameters of section 234 are less than the maximum thread diameter D2 of fixture 210. Abutment 320 also includes a section 326 between section 324 and bone fixture 210. Section 326 includes a maximum diameter D6 that is larger than diameter D4 and diameter D5 but still less than diameter D2. In this regard, section 326 constitutes a second portion of the exterior surface of the abutment 320 that extends along the longitudinal axis of the bone conduction implant 300 for a remainder of the longitudinal length of the abutment that extends from the bone fixture when the abutment is rigidly attached to the bone fixture that is not taken up by section 324. All outer diameters of this section are greater than the diameters of section 324 but less than the maximum thread diameter D2 of the fixture 210. However, in an alternate embodiment, section 326 may have at least some diameters that are greater than the maximum thread diameter D2.

FIG. 4 depicts yet another alternate embodiment of an abutment, abutment 420. As may be seen, abutment 420 includes an elongated cylindrical section having a diameter D7 that extends along most of the length of the abutment above the bone fixture 210. Abutment 420 has a conical section that extends into the bone fixture 210 that has a diameter D8 at the location where abutment 420 first extends into bone fixture 210, diameter D8 being less than diameter D7. As may be seen, diameter D7 is substantially equal to the maximum thread diameter D2 of fixture 210. Accordingly, FIG. 4 depicts an exemplary embodiment of an abutment having a portion that extends about 80% of the length of the portion of the abutment above the bone fixture 210 having diameters that are substantially equal to the maximum thread diameter D2 of the fixture 210.

In some alternate embodiments, the interface between the bone fixture and the abutment is such that the two fit together with a conical fit (and thus the interface between the two components is different than that depicted in the figures) that reduces the risk for gaps and unwanted micro-leakage of microbes that might otherwise exist if imperfections in the contact surfaces or incorrect tightening torques exist in the bone conduction implants.

In some embodiments, the fixture connection section 221 has an outer profile that is adapted to be seated within the bone fixture create a suitable connecting fit between the fixture 210 and abutment 220. The profile of the fixture connection section 221 provides an axially well-defined fit when the abutment 220 is fit to the bone fixture 210, while also providing for relative ease of disassembly.

Figure 5:
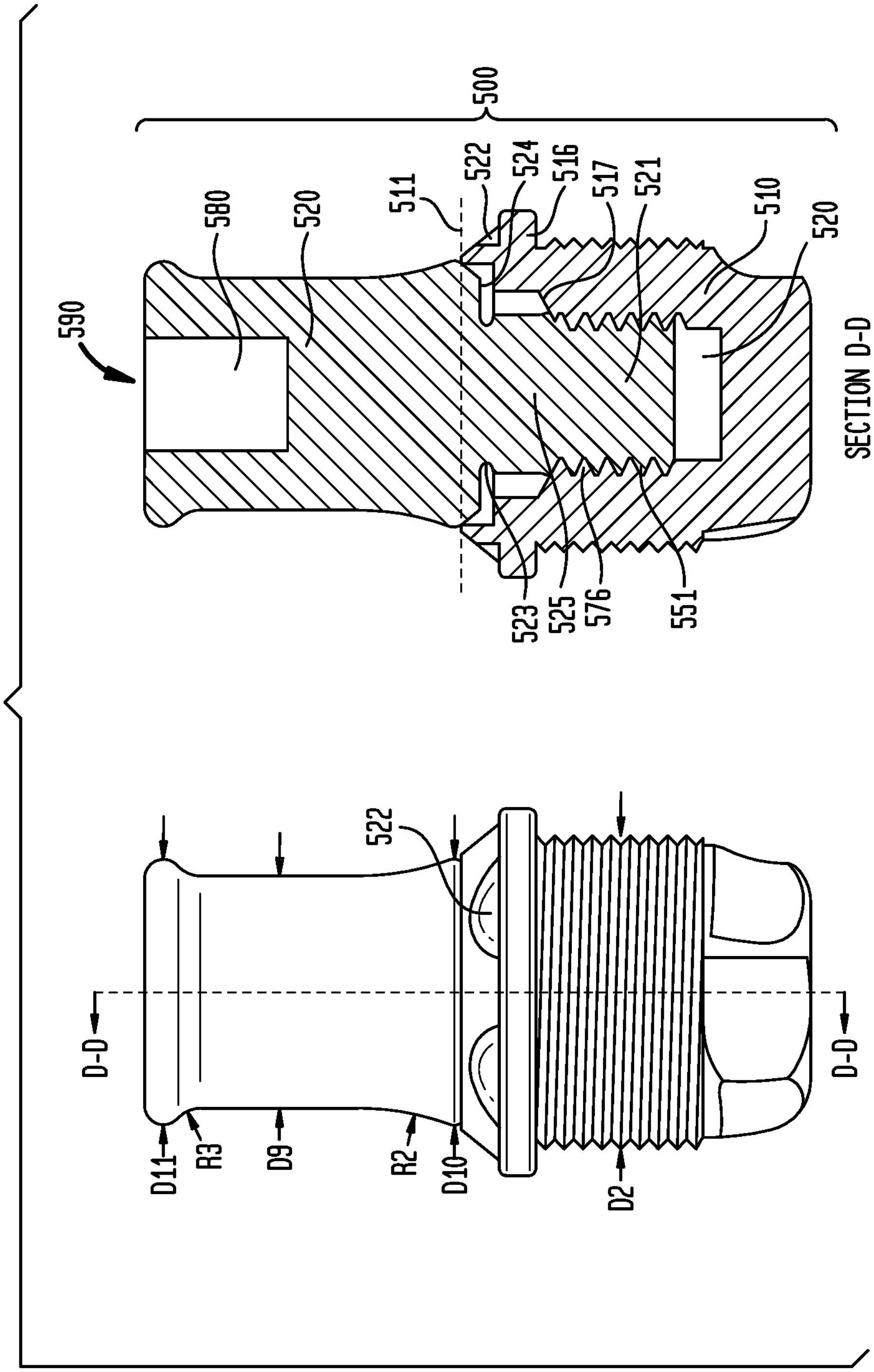
FIG. 5 depicts a side view and a cross-sectional view of a bone conduction implant according to yet another alternate exemplary embodiment.

As may be seen in FIGS. 5 and 6, abutments 520 and 620 utilize fixture connection sections 521 and 621, respectively, having different configurations than that of fixture connection section 221. Fixture connection sections 521 and 621 extend below reference planes 511 and 611, respectively. Abutment 520 includes an exterior surface having a cylindrical section with a diameter D9 and a section that flares outward from the cylindrical section in a parabolic fashion and/or with a constant radius R2 to a maximum diameter D10, the length of diameters D9 and D10 being less than diameter D2. Abutment 520 also includes a portion located above the cylindrical section that includes a section that flares outward from the cylindrical section in a parabolic fashion (that may have a constant radius R3, but may also have a radius that varies with position along the longitudinal axis) to a bulbous section having a maximum diameter D11 (again, that is less than diameter D2). This bulbous section may be utilized to attach to coupling adapter 140 of the operationally removable component, as further detailed below.

The fixture connection section 521 includes boss 525 extending from surface 524 on which male threads 576 that interface with female threads 551 in bore 550 of fixture 510. As may be seen, in the embodiment of FIG. 5, there is no abutment screw. Thus, the abutment 520 is configured to be rigidly attached to the bone fixture 510 without an additional attachment component (e.g., abutment fixture). Thus, the abutment 520 includes a cross-section lying on a plane on the longitudinal axis of the bone conduction implant (e.g., reference plane 511) that is solid. In contrast, abutments 220, 320, 420 and 620 nowhere have a cross-section lying on a plane on the longitudinal axis that is solid, owing to the need for through bore(s) extending through the abutment to receive the respective abutment fixtures.

As may be seen in FIG. 6, fixture connection section 521 includes an undercut 523 that prevents the build-up of stress at the intersection of surface 524 and boss 525 extending from surface 524.

Referring to FIG. 6, fixture connection section 621 is not symmetrical about the longitudinal axis 619 of the bone conduction implant 600. More specifically, as may be seen, the outer contours of fixture connection section 621 on planes normal to longitudinal axis 619 are not concentric with longitudinal axis 619. Instead, the outer profile of boss 625 extends eccentrically about axis 619 such that the wall thickness of boss 625 on planes normal to axis 619 varies from a first thickness to a second thickness and back to the first thickness as that wall thickness is measured rotationally about the axis 619. In an exemplary embodiment, this eccentricity forms a substantially smooth outer profile. Thus, a cross-section of the boss 625 on a plane normal to the axis 619 has an egg-shape or a cam shape.

In an alternate embodiment, boss 625 has a substantially circular outer profile forming a uniform wall thickness as measured rotationally about axis 619 except for a section from which a portion of the boss 625 has been machined out. Thus, a cross-section of the boss 625 on a plane normal to the axis 619 has a “D” shape.

The embodiment of FIG. 6 presents an abutment having outer diameters that are more narrow than the embodiments of FIGS. 2-5. Specifically, abutment 620 may have a section that extends about 60% to about 90% (and any sub-range therein in 1% increments) of the length of the abutment above reference plane 611 having an external surface diameter D12 that is about 50% to about 80% (and any sub-range therein in 1% increments) and/or about ⅔rds of the maximum thread diameter D2.

As may be seen, abutment screw 630 extends completely through a bore of abutment 620. In this configuration, the abutment screw 630 includes a screw head extending along section 682, the bottom of which reacts against the outer surface 684 of abutment 620 to pull abutment 620 to fixture 610, as detailed above. The screw head includes a bulbous section 626 having a maximum diameter D13 formed with a radius R4. The bulbous section narrows from its maximum diameter D13 and is adjacent to a relieved area having a minimum diameter D14. In this embodiment, the screw head of abutment screw 630 forms a coupling component 690 configured to couple to a coupling adapter of an operationally removable component of a bone conduction device 100. In an exemplary embodiment, the coupling component 690 is configured to be received in and couple to a coupling adapter of the operationally removable component. The coupling adapter of the operationally removable component may be a female component having teeth that are circularly arrayed and are elastically deformable such that the teeth deform outward upon the application of sufficient removal and/or installation force to the coupling adapter of the operationally removable component.

Section 682 of the abutment screw 630 forms, in some embodiments, a ball-joint that permits the operationally removable component to gimble about the bone conduction implant 600.

It is noted that in an exemplary embodiment, the fixture 210, abutment 220 and abutment screw 230, may be provided as a kit including all three components or may be provided as individual components. In accordance with one embodiment, the bone conduction implant 200 is delivered to the surgeon pre-mounted in its package to facilitate installation of the entire device in a single step. Abutment 220 may be pre-mounted to the fixture 210 at the manufacturing site with the correct tightening torque to obviate the need for the surgeon to know the correct tightening torque or to handle the separate pieces of the bone conduction implant 200. In an exemplary embodiment, abutment 220 includes female threads 291 below surface 284. These female threads 291 conform to male threads 276 of the abutment screw 230. Upon sufficiently screwing the abutment screw 230 through female threads 291, the abutment screw 230 is free to slide in the longitudinal direction until either screw head 270 or male threads 276 contact female threads 291, thus sufficiently retaining abutment screw 230 to abutment 220 while permitting abutment screw 230 to be rotated relative to abutment 220.

Abutments 320 and 420 of FIGS. 3 and 4, respectively, include a bore 387/487 with female threads 388/488. Female threads 388/488 permit the installation and removal of a magnetic implant abutment coupling (not shown in FIG. 3 and, but described in general terms with respect to FIG. 7 below) that may be magnetic to form an abutment coupling 390/490 configured to magnetically couple to the coupling adapter 140 of the operationally removable component of the bone conduction device. This aspect will be described in greater detail below with respect to FIG. 7. Still further, bores 387/487, in a modified configuration from that depicted in FIGS. 3 and 4, alone or in combination with at least a portion of the outer surface of the top portion of the abutments form an abutment coupling 390/490 (without the use of the magnetic implant abutment coupling) configured to couple to the coupling adapter 140 of the operationally removable component of the bone conduction device. This aspect will be described in greater detail below with respect to FIG. 8.

Abutment 520 includes bore 580 which may include female threads (not shown) to receive a magnetic implant abutment coupling to form an abutment coupling 590. Still further, in another embodiment, bore 580, alone or in combination with at least a portion of the outer surface (the portion above the cylindrical section having diameter D9) of the top portion of the abutment forms an abutment coupling 590 configured to couple to the coupling adapter 140.

It is noted at this time that in some embodiments, parts or all of the surfaces of the abutments disclosed herein, such as those surfaces that contact the skin, fat and/or muscle layers of the recipient include a surface coating over the base material of the abutment. An exemplary surface coating may be calcium phosphate (hydryapatite). Alternatively or in addition to a surface coating, the surface(s) may be subjected to a surface treatment such as, for example, etching or blasting. In an exemplary embodiment, the surfaces forming D1, D4, D7, D9, D12 and/or the surfaces forming R1 and/or R2 may have such surface treatments and/or surface coatings.

Figure 7:
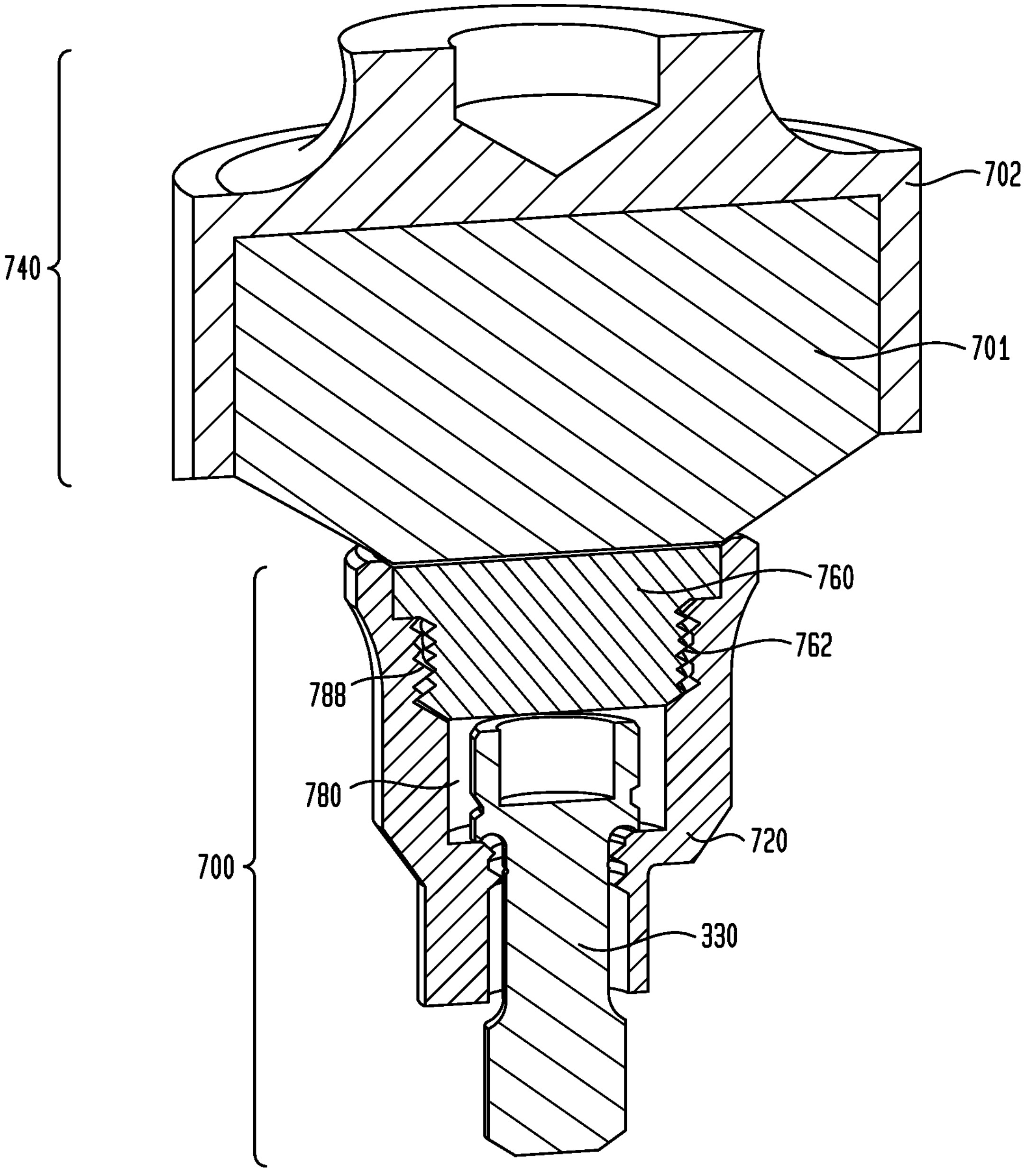
FIG. 7 depicts a cross-sectional view of a portion of a bone conduction implant magnetically coupled to a coupling assembly according to an exemplary embodiment.

FIG. 7 depicts an exemplary bone conduction implant 700 magnetically attached to an exemplary coupling adapter 140 so as to place the components into vibrational communication. The magnetic attachment permits the operationally removable component of which the coupling adapter 140 is apart of to be easily removed and attached to the bone conduction implant 700.

Bone conduction implant includes abutment 720 and abutment screw 330 utilized to rigidly attach abutment 720 to a bone fixture (not shown) of the bone conduction implant 700. Abutment 720 may correspond to any abutment detailed herein and variations thereof providing that the abutment 720 is configured to removably connect to a magnetic implant abutment coupling, such as magnetic implant abutment coupling 760 as detailed in FIG. 7, and variations thereof.

As may be seen, magnetic implant abutment coupling includes male screw threads 760 configured to be received by female threads 788 located in bore 780 of abutment 720. In an exemplary embodiment, magnetic implant abutment coupling 760 is a permanent magnet, although in other embodiment, it may be any type of ferromagnetic material. Magnetic implant abutment coupling 760 may be configured with a wrench attachment fitting or a screw driver attachment fitting to facilitate installation and removal of the magnetic implant abutment coupling 760 to/from the abutment 720. As detailed herein, abutment 720 may include wrench flats or the like to provide a counter torque to the abutment 720 to react against the torque of the magnetic implant abutment coupling 760.

Coupling adapter 740 is part of an operationally removable component such as that detailed above that includes a vibrating actuator. Coupling adapter 740 may correspond to coupling adapter 140 detailed above. Coupling adapter 740 is in vibrational communication with the vibrating actuator, such that vibrations generated by the vibrating actuator are communicated to the coupling adapter 740. As may be seen, the coupling adapter 740 includes a permanent magnet 701 retained in housing 702. The permanent magnet 701 in combination with permanent magnet 760 is configured to magnetically couple the coupling adapter 740 to the bone conduction implant 700 via magnetic attraction between the permanent magnets so as to establish a vibrational conductive path between the coupling adapter 740 and the magnetic implant abutment coupling 760, and thus the bone conduction implant 700.

As noted above, magnetic implant abutment coupling 760 may correspond to a permanent magnet. By utilizing two permanent magnets, alignment of the coupling adapter 740 with the magnetic implant abutment coupling 760 is improved relative to the use of only one permanent magnet and a corresponding ferromagnetic component that is not a permanent magnet.

The magnetic implant abutment coupling 760 may be used with any of the abutments disclosed herein and variations thereof and/or abutment screw 690. Particularly, it may be mounted in any of the bores forming the couplings detailed herein.

It is noted that the magnetic coupling detailed herein permits the operationally removable component to be relatively easily and/or quickly removed and attached to the bone conduction implant by the recipient. In an exemplary embodiment, it permits removal and attachment without imparting a relatively high torque to the bone conduction implant, even, in some embodiments, when the recipient moves the bone conduction device in a direction entirely normal to the longitudinal axis of the bone conduction axis. In an exemplary embodiment, a removal force of about 10 N to about 32 N will be sufficient to decouple coupling adapter 740 from magnetic implant abutment coupling 760.

Figure 8:
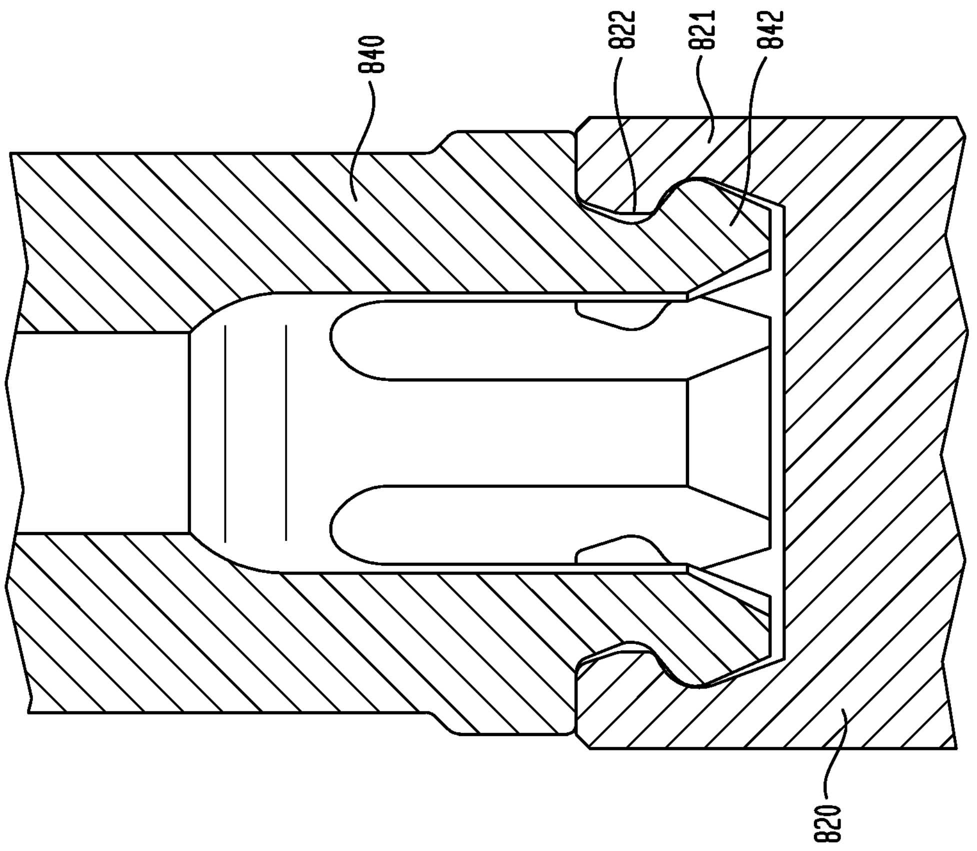
FIG. 8 depicts a cross-sectional view of a portion of a bone conduction implant snap-coupled to a coupling assembly according to an alternate embodiment.

FIG. 8 depicts a snap-coupling arrangement according to an exemplary embodiment. As may be seen, abutment 820 includes a recess formed by sidewall 821 that has a overhang 822 that interfaces with corresponding teeth 842 of coupling adapter 840. Coupling adapter 840 may correspond to coupling adapter 140 detailed above, and may be part of an operationally removable component of a bone conduction device as described herein and variations thereof. Teeth 842 elastically deform inward upon the application of sufficient removal and/or installation force to the coupling adapter 840. In an exemplary embodiment, 820 may correspond to any abutment herein and variations thereof providing that it includes the snap-coupling arrangement and variations thereof.

It is noted that while the male component is depicted as being a part of the coupling adapter 840 and the female component is depicted as part of the abutment, in other embodiments, this may be reversed. It is noted that the coupling arrangement of FIG. 3 may be used with any of the abutments disclosed herein and variations thereof and/or abutment screw 690. Particularly, the male component or the female component may be mounted in any of the bores forming the couplings detailed herein.

Couplings 290-690 are variously adapted to cooperate with various couplings of the operationally removable component. Couplings that may be used with some embodiments detailed herein may utilized magnetic couplings, ball-joint couplings, snap couplings and/or positive retention couplings, etc. Any type of coupling that may permit some embodiments to be practiced as detailed herein may be used in some embodiments.

Features pertaining to the attachment of the abutments to the respective bone fixtures will now be briefly described.

Referring to bone conduction implant 200 of FIG. 2, flange 216 may be in the form of a protruding hex. That is, it may have a hexagonal cross-section that lies on a plane normal to the longitudinal axis 219 of the bone fixture 210/bone conduction implant 200 such that a female hex-head socket wrench or the equivalent may be used to apply torque to the bone fixture 210, thereby screwing it into the skull. However, in other embodiments, the flange 216 may be provided with grooves such as grooves 522 as located in flange 516 of bone conduction implant 500 discussed above. As will be described further below with respect to bone conduction implant 500, these grooves receive teeth of an installation tool to facilitate insertion of the bone fixture 210 into the skull.

To rigidly connect the abutment 220 to the bone fixture 210, abutment screw 230 is screwed into bore 250 of bone fixture 210. In an exemplary embodiment, a healthcare provider utilizes a male hex head wrench (e.g., an Allen wrench) inserted into upper bore 280 and into internal bore 272 of bone fixture 210 to apply torque thereto to secure the abutment 220 to the fixture 210. Internal bore 272 may have an internal cross-section lying on a plane normal to the longitudinal axis 219 having the profile of a hex so as to permit the hex head to sufficiently interface with the fixture 210.

In an alternate embodiment, screw head 270 of abutment screw 230 may instead or in addition to an internal hex of bore 272 utilize an external hex geometry. In such an exemplary embodiment, the screw head 270 may extend further upward (into bore 280, above surface 282, of abutment 220) than that depicted in FIG. 2 so that the hex geometry extends above surface 282, thereby permitting a female hex wrench to interface with the hex geometry.

In an exemplary embodiment, an installation/removal tool having a through bore and teeth that interface with grooves on flange 216 is fit onto bone fixture 210 such that the teeth of the installation tool fit into the grooves and an opposite end of the installation tool extends above the end of the abutment screw 230. This installation/removal tool may be the same tool used to apply implantation torque to the bone fixture 210 to implant the bone fixture 210 into the skull. The aforementioned male hex head wrench is then fit into the through bore and into bore 272 of the abutment screw 230. While the healthcare professional applies a torque to abutment screw 230 to torque the abutment screw 230 into the bone fixture 210, a counter-torque may be applied to the bone fixture 210 via the installation/removal tool so that the torque applied to the abutment screw does not interfere with the implantation torque of the bone fixture 210. In an alternate embodiment where the bone fixture 210 has the aforementioned hex outer profile, instead of teeth, the installation/removal tool may be in the form of a female hex-head wrench with a through bore through which the Allen wrench extends. Use of the installation/removal tool with the female hex-head wrench corresponds to the installation/removal tool with teeth as just detailed with the exception of the teeth.

In an exemplary embodiment, a breaking torque may be applied to the abutment screw 230 to remove the abutment screw 230 from bone fixture 210. The installation/removal tool may be used in a similar fashion to ensure that the breaking torque does not interfere with the insertion torque of the bone fixture 210, except that the counter torque is applied in the opposite direction.

Still further, bore 280 may have a hexagonal interior cross-section and may be configured to receive a male hex-head wrench having a through bore. In an exemplary embodiment, the aforementioned allen wrench may be inserted through the through bore while the male hex-head wrench is located in bore 280 to reach the abutment screw 230. A counter torque may be applied to the abutment 220 in lieu of or in addition to the counter torque applied to the bone fixture 210.

The aforementioned installation/removal tools and processes, modified or unmodified, may be used with the bone conduction implants 300, 400, 500 and 600 and variations thereof. Abutment 420 includes a bore 480 that is comparably used in the same and/or similar manner as that of bore 280.

With respect to the embodiment of FIG. 3, in contrast to abutment 220, abutment 320 does not include bore 280 adjacent to bore 387. Instead, wrench flats 380 may be located about the outer periphery of the abutment 320 at the top as may be seen. These wrench flats 380 may be used to apply a counter torque in a manner similar to and/or the same as the male hex-head wrench detailed above configured to fit into bore 280 with respect to bone conduction implant 200. As may be seen in FIG. 6, abutment 620 also includes wrench flats 680 that may be used in a similar manner and/or a same manner as wrench flats 380.

Abutment 520 includes bore 580 that may be used to receive a wrench similar to and/or the same as the wrenches detailed herein used to apply torque to the abutment screws.

Abutment screw 630 includes a bore 672 which may be used in a similar manner and/or the same manner as bore 272 of abutment screw 230.

In an exemplary embodiment, there is an installation and/or removal tool having a monolithic component having teeth and/or a female hex-head or other wrench receptacle and a through bore that extends from the end with the teeth to the other end. An abutment as detailed herein may be inserted into the through bore while the installation and/or removal tool interfaces with the bone fixture so as to apply torque thereto. After the abutment is secured to the bone fixture and/or after the abutment is released from securement to the bone fixture, the tool may be removed from the bone fixture. Embodiments include systems and methods of using this tool to attach and detach abutments to bone fixtures detailed herein and variations thereof.

In some exemplary embodiments of those detailed herein and/or variations thereof, the abutment-bone fixture interface may utilize a conical fit configured to reduce the risk for gaps and unwanted micro-leakage, regardless of any imperfections in the contact surfaces or incorrect tightening torques.

In certain embodiments, the upper end face of the fixture has an open cavity with a tapered interior surface forming a seat for the tapered exterior side wall of the abutment. In other embodiments, the bottom end face of the abutment has an open cavity with a cylindrical interior surface forming a female seat for a cylindrical exterior male portion of the fixture. These configurations may create a good connecting fit between the fixture and abutment so as to reduce the risk of micro-leakage.

Embodiments of the bone conduction implant may be used in connection with systems where sound is transmitted via the skull directly to the inner ear of a person with impaired hearing. However, embodiments of the bone conduction implant may also be configured for use in connection with other types of systems with components anchored in the skull and for ear or orbital prostheses which are also anchored in the skull. Other applications of the bone conduction implant are also contemplated.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A bone conduction implant, comprising:

a bone fixture including a male screw section configured to screw into a skull; and an abutment configured to be attached to the bone fixture, wherein the abutment includes a first exterior surface diameter lying on a first plane normal to a longitudinal axis of the bone conduction implant that is greater than a minimum outer diameter of the bone fixture lying on a second plane parallel to the first plane, wherein the abutment includes a second exterior surface diameter lying on a third plane parallel to the first plane, wherein the second exterior surface diameter is the same as the first exterior surface diameter, and wherein the abutment is configured for a male-female coupling with an operationally removable component, the male coupling portion of the coupling being established by the abutment, and the abutment includes a skin interfacing surface that has a constant outer diameter.

2. The bone conduction implant of claim 1, wherein:

the bone fixture includes a self-tapping feature, which self-tapping feature establishes an end of the minimum outer diameter.

3. The bone conduction implant of claim 1, wherein:

the abutment includes a concave curved portion relative to an outside of the abutment that extends less than a quarter of a distance of the abutment that extends above the bone fixture when the abutment is attached to the bone fixture.

4. The bone conduction implant of claim 1, wherein:

an abutment screw connects the abutment to the bone fixture; and an entirety of the abutment screw is below a topmost portion of the abutment, the topmost portion being opposite the bone fixture.

5. The bone conduction implant of claim 1, wherein:

the abutment includes a concave curved portion, relative to an outside of the abutment.

6. The bone conduction implant of claim 5, wherein:

the concave curved portion is located closer to a top of the abutment than a bottom of the abutment, the top of the abutment being further from the bone fixture than the bottom of the abutment when the abutment is attached to the bone fixture, and the top of the abutment is established by a surface that is planar and parallel to the first plane.

7. The bone conduction implant of claim 1, wherein:

the first exterior surface diameter and the second exterior surface diameter are less than a maximum outer diameter of the bone fixture which lies on a plane parallel to the first plane.

8. The bone conduction implant of claim 1, wherein:

exterior surface diameters including the first exterior surface diameter and the second exterior surface diameter respectively lying on planes parallel to the first plane are less than a maximum outer diameter of the bone fixture which lies on a plane parallel to the first plane and are the same for at least part of a longitudinal extension of the abutment.

9. The bone conduction implant of claim 8, wherein:

the at least part of a longitudinal extension of the abutment is a majority of the longitudinal extension of the abutment.

10. The bone conduction implant of claim 1, wherein:
the abutment includes a concave portion, relative to an outside of the abutment, that is a concave portion that is closest to the male screw section; and
the skin interfacing surface is between the concave portion and the bone fixture when the abutment is attached to the bone fixture.

11. The bone conduction implant of claim 1, wherein:
the abutment includes a cylindrical portion extending a majority of a longitudinal length of the abutment.

12. The bone conduction implant of claim 1, wherein:
the abutment includes a cylindrical portion extending a majority of a longitudinal length of the abutment that interfaces with skin when implanted.

13. The bone conduction implant of claim 1, wherein:
all outer circumferences of cross-sections of the abutment lying on respective planes that are normal to the longitudinal axis are concentric with each other.

14. A method, comprising:
obtaining a bone conduction implant; and
implanting the bone conduction implant in a human, wherein
the bone conduction implant includes a bone fixture including a male screw section configured to screw into a skull, wherein the action of implanting the bone conduction implant includes screwing the male screw section into bone of the human,
the bone conduction implant includes an abutment attached to the bone fixture,
the abutment includes a first exterior surface diameter lying on a first plane normal to a longitudinal axis of the bone conduction implant that is greater than a minimum outer diameter of the bone fixture lying on a second plane parallel to the first plane, wherein the abutment includes a second exterior surface diameter lying on a third plane parallel to the first plane that is the same as the first exterior surface diameter,
the abutment is configured for a male-female coupling with an operationally removable component, the male coupling portion of the coupling being established by the abutment, and
the abutment includes a cylindrical portion extending about the longitudinal axis, the first exterior surface diameter and the second exterior surface diameter being established by the cylindrical portion, and the cylindrical portion extends from below a surface of skin of the human to above the surface of the skin of the human upon implantation of the bone conduction implant in the human.

15. The method of claim 14, wherein:
the cylindrical portion extends a majority of a longitudinal length of the abutment.

16. The method of claim 14, wherein:
the first exterior surface diameter and the second exterior surface diameter are less than a maximum outer diameter of the bone fixture which lies on a plane parallel to the first plane.

17. The method of claim 14, wherein:
the cylindrical portion is the only cylindrical part of the abutment that contacts the skin after implantation of the bone conduction implant.

18. The method of claim 14, wherein:
the bone conduction implant has an exterior surface; and
upon implantation of the bone conduction implant, at least a majority the exterior surface of the abutment that contacts the skin has a constant outer diameter when measured normal to the longitudinal axis.

19. The method of claim 14, wherein:
the bone conduction implant has an exterior surface; and
upon implantation of the bone conduction implant, all of the exterior surface of the abutment that contacts the skin has a constant outer diameter when measured normal to the longitudinal axis.

20. The method of claim 14, wherein:
upon implantation of the bone conduction implant, all diameters of the exterior surface of the abutment that contact the skin lying on respective planes parallel to the first plane are less than a maximum outer diameter of the bone fixture which lies on a plane parallel to the first plane.

* * * * *